(12) United States Patent
Cosatto et al.

(10) Patent No.: US 8,638,846 B1
(45) Date of Patent: Jan. 28, 2014

(54) SYSTEMS AND METHODS FOR ENCODING AND DECODING VIDEO STREAMS

(75) Inventors: Eric Cosatto, Highlands, NJ (US); Hans Peter Graf, Lincroft, NJ (US); Joern Ostermann, Morganville, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1480 days.

(21) Appl. No.: 10/601,495

(22) Filed: Jun. 23, 2003

(51) Int. Cl.
H04N 7/12 (2006.01)

(52) U.S. Cl.
USPC .................................................. 375/240.01

(58) Field of Classification Search
USPC ............ 348/14.13, 415.1, 14.01; 375/244.04, 375/240, 240.13, 240.12, 240.01; 345/473; 382/243, 166, 118
IPC ......................................................... H04N 7/12
See application file for complete search history.

(56) References Cited

U.S. PATENT DOCUMENTS

| | | | | |
|---|---|---|---|---|
| 4,488,175 A * | 12/1984 | Netravali | ................... | 348/409.1 |
| 4,951,140 A * | 8/1990 | Ueno et al. | ................. | 348/413.1 |
| 5,710,590 A * | 1/1998 | Ichige et al. | ............... | 348/14.01 |
| 5,745,178 A * | 4/1998 | Hartung et al. | .......... | 375/240.04 |
| 5,832,115 A * | 11/1998 | Rosenberg | ................... | 382/199 |
| 5,841,470 A * | 11/1998 | Welsh | ........................ | 375/240.1 |
| 5,903,673 A * | 5/1999 | Wang et al. | .................... | 382/236 |
| 5,959,672 A * | 9/1999 | Sasaki | ...................... | 375/240.23 |
| 5,995,095 A * | 11/1999 | Ratakonda | .................... | 715/255 |
| 6,002,794 A * | 12/1999 | Bonneau et al. | .............. | 382/166 |
| 6,037,988 A * | 3/2000 | Gu et al. | ................... | 375/240.16 |
| 6,044,168 A * | 3/2000 | Tuceryan et al. | .............. | 382/118 |
| 6,055,330 A * | 4/2000 | Eleftheriadis et al. | ........ | 382/154 |
| 6,064,436 A * | 5/2000 | Okada | ....................... | 375/240.16 |
| 6,069,631 A * | 5/2000 | Tao et al. | ....................... | 345/418 |
| 6,205,260 B1 * | 3/2001 | Crinon et al. | .................. | 382/284 |
| 6,614,466 B2 * | 9/2003 | Thomas | ..................... | 348/14.13 |
| 6,757,434 B2 * | 6/2004 | Miled et al. | .................... | 382/236 |
| 6,798,977 B2 * | 9/2004 | Maeda | .......................... | 386/341 |
| 6,879,709 B2 * | 4/2005 | Tian et al. | ...................... | 382/118 |
| 6,919,892 B1 * | 7/2005 | Cheiky et al. | .................. | 345/473 |
| 7,027,054 B1 * | 4/2006 | Cheiky et al. | .................. | 345/473 |
| 7,084,877 B1 * | 8/2006 | Panusopone et al. | ......... | 345/474 |
| 7,085,434 B2 * | 8/2006 | Srinivasa | ....................... | 382/293 |
| 7,148,908 B2 * | 12/2006 | Riek et al. | ...................... | 345/646 |
| 7,184,602 B2 * | 2/2007 | Cohen et al. | ................... | 382/243 |
| 2004/0091158 A1 * | 5/2004 | Miled et al. | .................... | 382/236 |
| 2007/0179918 A1 * | 8/2007 | Heisele et al. | .................. | 706/13 |
| 2007/0230773 A1 * | 10/2007 | Nagao et al. | .................. | 382/159 |
| 2008/0063263 A1 * | 3/2008 | Zhang et al. | ................... | 382/159 |

* cited by examiner

Primary Examiner — Tung Vo

(57) ABSTRACT

Systems and methods for encoding/decoding a video stream. Animated talking heads are coded using partial offline encoding, multiple video streams, and multiple reference frames. The content of a face animation video that is known beforehand is encoded offline and the remaining content is encoded online and included in the video stream. To reduce bit rate, a server can stream multiple video sequences to the client and the video sequences are stored in the client's frame store. The server sends instructions to play a particular video sequence instead of streaming the particular video sequence. Multiple video streams can also be streamed to the client. Positional data and blending data are also sent to properly position one video stream relative to another video stream and to blend one video stream into another video stream.

4 Claims, 4 Drawing Sheets

SYSTEMS AND METHODS FOR ENCODING AND DECODING VIDEO STREAMS

BACKGROUND OF THE INVENTION

1. The Field of the Invention

The present invention relates to systems and methods for streaming video and more specifically to encoding and/or decoding a video stream. More particularly, the present invention relates to systems and methods for encoding and/or decoding a video stream using partial offline encoding, multiple video streams, and/or multiple reference frames.

2. Introduction

The Internet provides access to a large number of different services and resources that can be accessed through a growing number of websites. Search capabilities, customer service, sales, database services, etc. are examples of the services and resources that are provided and accessed over the Internet. In many situations, the websites that provide these services and resources need to interact or communicate with their users.

Effective communication is often vital to enhance the user experience. In fact, the success of a particular website may depend on the ability of the website to communicate effectively with its users. The way a website communicates with its users may have an impact on whether the user returns to the website in the future. Thus, websites are continually striving to communicate with their users in a more effective manner.

At first, websites primarily used text to communicate with users. As the capabilities of websites improved and bandwidth increased, websites began to include images in their communications with users. Today, some websites are beginning to interact and communicate with users using more advanced interfaces. For example, some websites interact with users using multiple images to express emotion. These images may include happy faces, sad faces, confused faces, and the like. These images are accompanied by text that conveys information to the user of the website.

The next step in natural language interfaces is to utilize animated talking faces to further enhance the communication between a website and its users. By improving the interface or communication with users, the services or resources provided by a website become more effective and efficient. Using animated talking faces or face animation, however, is a considerably more difficult and complex undertaking than using simple graphics and text and there are several reasons why animated talking faces are not normally used. Face animation, for instance, currently requires the client to render the animated face on the client's screen. Unfortunately, operating systems and popular media players do not provide support for face animation. Furthermore, downloading and installing a plug-in module is a solution that is unattractive to many users.

Another more problematic aspect of using animated faces is that high-quality face models for sample-based face animation tend to be rather large and are often, on the order of several hundred Megabytes. The sheer size of the sample-based face animation face models effectively prohibits their use on slower Internet connections. The size and magnitude of these face models strain fast Internet connections as well.

One potential solution to this problem is to stream a video from a server to a client using an existing media, player on the client. This does not require as much data as high-quality face models and can use software that already exists on the client. Even this solution, however, may strain the connection between the client and the server. A video stream that has decent subjective quality requires at least 80 kbits/second. This data rate must be maintained continuously even when the face model is not speaking or is waiting on input from a user. Streaming video with decent subjective quality from a server to a client requires excessive bandwidth. In order to meet realtime considerations, motion compensation quality and macroblock mode selection are often sacrificed.

BRIEF SUMMARY OF THE INVENTION

These and other limitations are overcome by the present invention which relates to systems and methods for encoding and/or decoding video streams. More particularly, the present invention relates to encoding and/or decoding animated talking head video streams. The present invention has the advantage of reducing the bit rate required to stream animated talking heads by: partially encoding the video stream offline at the server; using multiple reference frames for face animation; and using multiple video streams that are composed into a scene at the client.

In face animation, the movement of the talking head is controlled by a server. Thus, much of the content is known before the face animation video is streamed to a client. The content of the face animation that is known can be encoded more efficiently offline than the content of the face animation that is known can be encoded in realtime. The unknown portion of the face animation video is unknown because it is often dependent on the dialog with the user at; the client. The unknown portion is encoded online in realtime and is inserted into the video stream in realtime. In face animation video, the unknown portion usually refers to the eye and mouth portions of a talking head.

In the offline encoded portion, the macroblocks that correspond to the eye and mouth images are labeled and are included in the offline encoded video. During animation of the face, the online encoder identifies each labeled macroblock, estimates motion and computed mode decisions for each labeled macroblock, and replaces the bits of the offline encoded video with the online encoded portion. More specifically, the portion of the offline video that corresponds to the unknown content of the video is replaced by the online encoder.

The offline encoded content can be represented as multiple video sequences. In another embodiment of the present invention, the client stores more than one video sequence in a frame store. After the server streams a particular video sequence to the client, that video sequence can be used repeatedly by the client without having to download that sequence a second time. The server sends instructions to the client that instruct the client to play a particular video sequence. The video sequence in the frame store can also be played forwards and backwards. In other words, the server directs the client to play a particular sequence that is already in the frame store rather than streaming a particular video sequence to the client a second time. Thus, the bandwidth requirement of the face animation video is reduced. Also, the server can deliver transitions to the frame store that enable the client to transition from one video sequence in the frame store to another video sequence stored in the frame store.

In yet another embodiment, the server can deliver a face animation video using more than one video stream. The background sequence can be served to the client as described above and can take advantage of offline encoding and of storing multiple video sequences in the frame store. The eye and mouth video sequences are sent in separate video streams and are blended, into the background video sequence using an alpha map that defines a blending function. Because the position of the talking head is always known, the eye and mouth videos can be properly placed in the face animation video using a scene graph that describes the relative positions of the eye, mouth, and background video sequences.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Face animation for interactive services often requires real-time and low latency systems. The present invention relates to streaming video from a server to a client and more particularly to streaming face animation video from a server to a client. The present invention reduces the bit rate of a video stream by: (i) using partial offline encoding, (ii) using multiple reference frames for face animation, (iii) using multiple video streams, and/or (iv) storing multiple video sequences on the client.

One advantage of the present invention is that a face animation player does not need to be downloaded and installed on each client. In one embodiment, face animation is generated by overlaying eye and mouth videos over a background video. In face animation, the motion of the face, head, shoulders, etc. is completely controlled by the server and in one embodiment only the content of the eyes and mouth is unknown offline. Much of the face animation can therefore be encoded efficiently offline and only the eyes and mouth need to be encoded online. This reduces the bit rate of the video stream. The subjective quality of the face animation is also improved. The present invention is described in terms of sample-based face animation, but one of skill in the art can appreciate that the invention can be applied to other video streams as well and is not limited to sample-based face animation.

Figure 1:
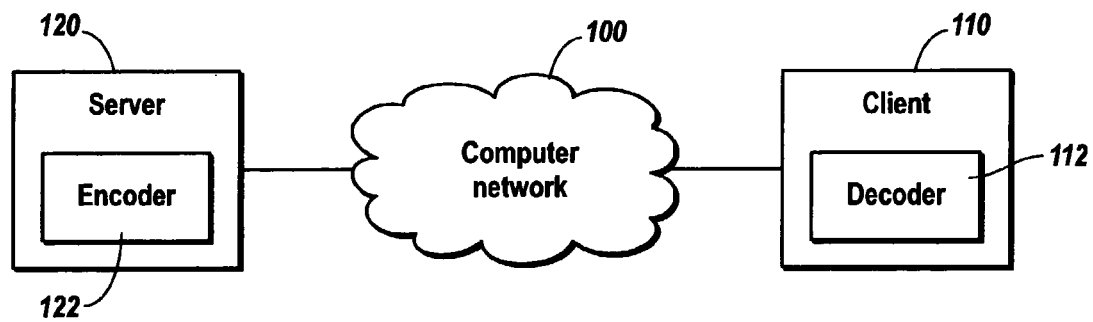
FIG. 1 illustrates an exemplary environment for implementing embodiments of the present invention.

FIG. 1 is a block diagram illustrating an exemplary environment for implementing embodiments of the present invention. FIG. 1 illustrates a server 120 that sends a video bitstream to a client 110 over a network 100 such as the Internet. The server 120 uses an encoder 122 to encode the video bitstream that is delivered to the client 110. In one embodiment, at least a portion of the video stream is encoded offline and then combined with another portion of the video stream that is encoded online. The online encoded portion corresponds to the unknown content of face animation (usually the eyes and mouth). The eyes and mouth are unknown, in this instance, because the content of the eyes and mouth is usually determined by the response of the server to the input from the client. The movement of the upper body and head, however, is independent of the dialog and the spoken words and is already known.

The client uses a decoder 112 to decode the encoded video bitstream and display the decoded video to a user. The server 120 can transmit several different video sequences to the client 110. The client 110 stores the video sequences and can repeat the video sequences in an arbitrary order or as instructed by the server 120. Thus, once a particular sequence is fully downloaded to the client 110, the server 120 does not have to transmit that particular sequence repeatedly. Various background sequences can be sent to the client and played when the server provides instructions to the client. The face animation can thereby be continuous at the client and the bit rate of the video stream can be reduced.

Figure 2:
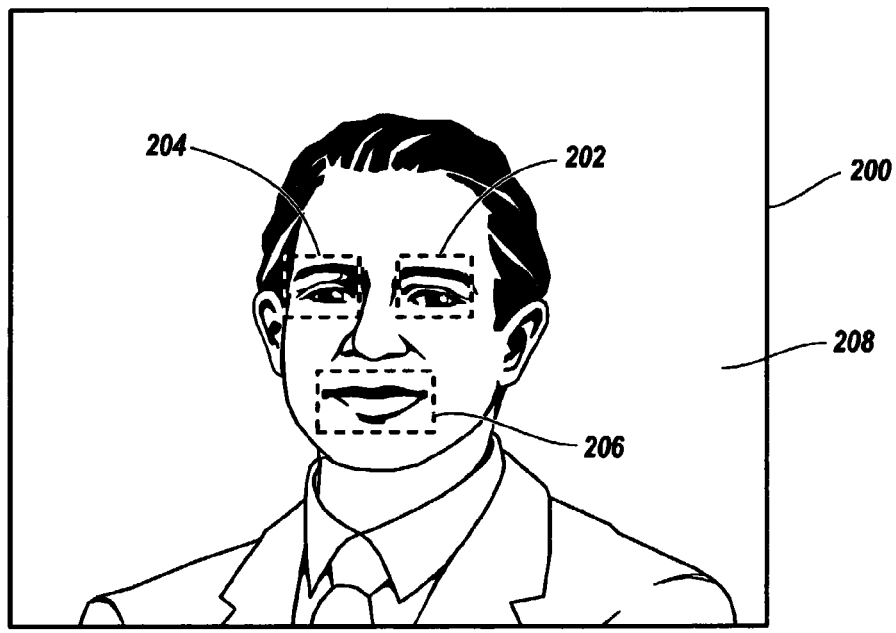
FIG. 2 illustrates a face animation video that includes a right eye video portion, a left eye video portion, a mouth video portion, and a background video portion.

FIG. 2 illustrates an exemplary sample of a face animation video stream that delivered from a server to a client. The frame 200 includes, in this example, a mouth portion 206, a right eye portion 204, and a left eye portion 202. The content of these portions (206, 204, 202) is usually unknown when the server is not connected with the client and thus cannot be encoded offline. The remaining portion of the frame 200 is included in a background portion 208. The background video portion or sequences (head movement, upper body motion, etc.) is known offline and can be encoded efficiently offline. The bit rate of the background portion is thereby reduced because offline encoding can typically be performed more efficiently than online encoding.

One of the properties of face animation video is that the motion of the video, including the face, eyes, and mouth, is controlled by the server computer. The difference between the various moving parts of the face animation video is that the content of, for example, the upper body and head is known offline while the content of the eyes and mouth is not known offline. Thus, several background sequences can be encoded offline and they can be concatenated at the client in an arbitrary order after they are streamed to the client. Also, transitions between background sequences can also be computed or encoded offline and transmitted as needed.

Encoding the background portion or other known portions of the video helps meet the interactive requirements of real-time and low latency systems. In one embodiment, the portions of the video sequence encoded offline, in comparison to a realtime encoder, can save 50% of the bitrate or more using quarter pel motion estimation and rate distortion optimized macroblock mode selection. For optimized encoding see: T. Wiegand, M. Lighstone, D. Mukherjee, T. George Campbell, and Sanjit K. Mitra, "Rate Distortion Optimized Mode Selection for Very Low Bit Rate Video Coding and the Emergine H.263 Standard," *IEEE Transactions on Circuit and Systems for Video Technology*, Vol. 5, No. 2, April 1996; and Markus Flierl, Thomas Wiegand, and Bernd Girod, "Rate-Constrained Multihypothesis Prediction for Motion-Compensated Video Compression," *IEEE Transactions on Circuits and Systems for Video Technology*, Vol. 12, No. 11, November, 2002, pp. 957-969, which are hereby incorporated by reference.

Figure 3:
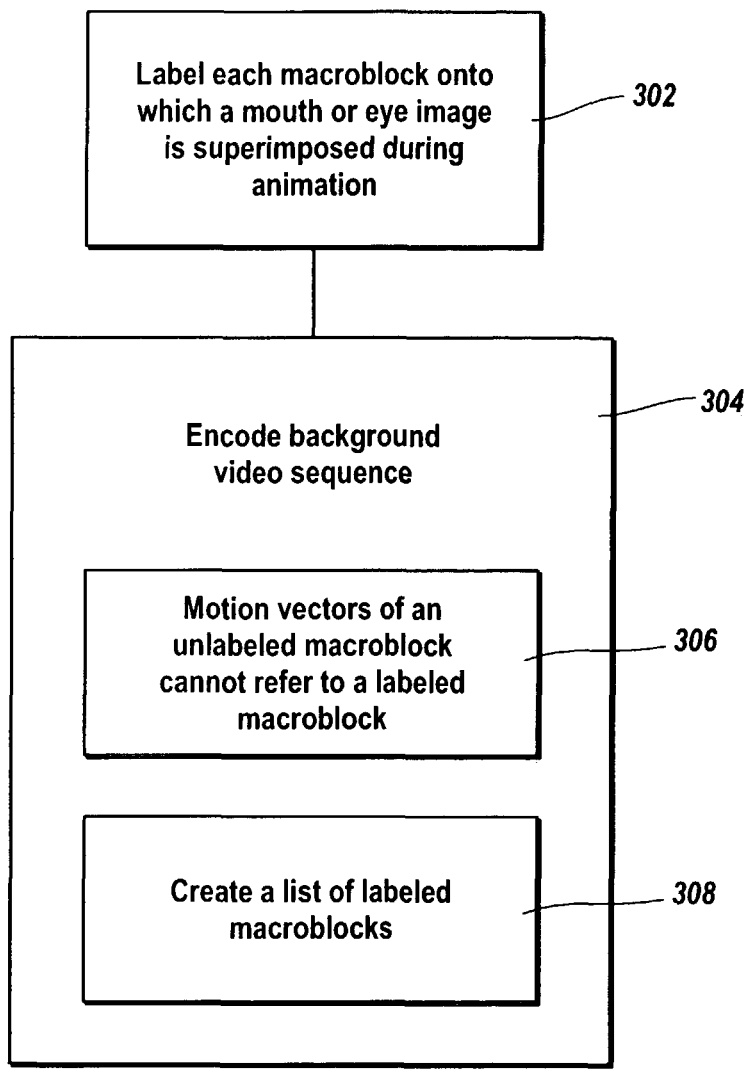
FIG. 3 illustrates one embodiment of a method for encoding a face animation video offline.
Figure 4:
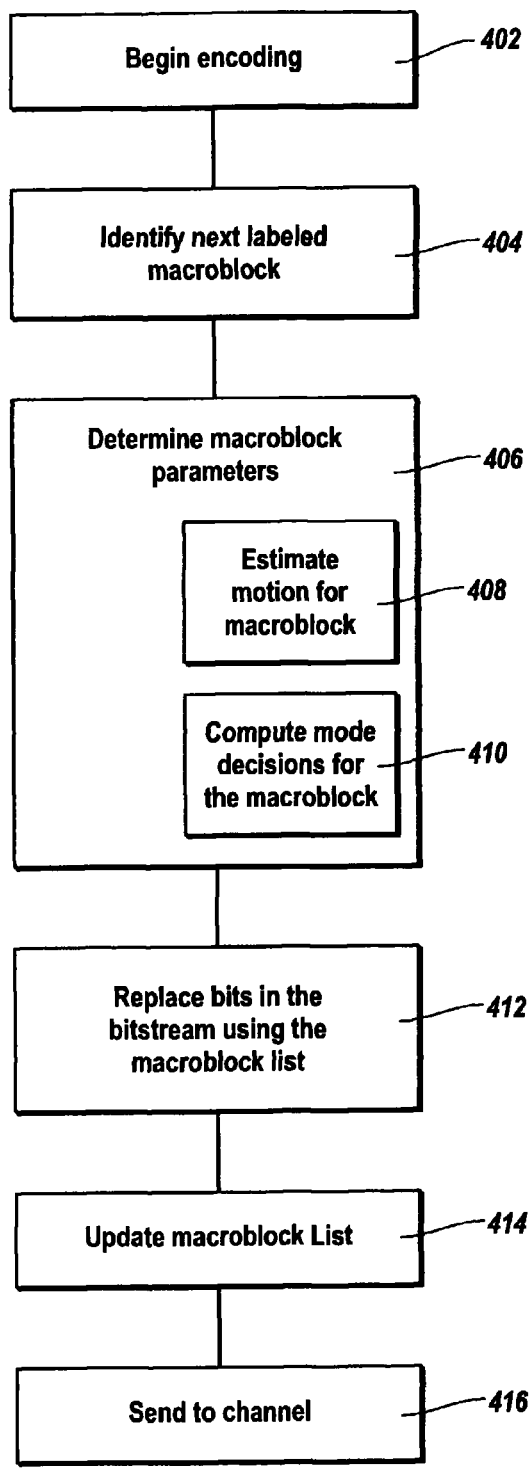
FIG. 4 illustrates one embodiment of a method for combining an offline encoded video stream with online content.

FIGS. 3 and 4 illustrate exemplary methods for encoding a face animation video. Generally, the known content or background portion of the face animation video is encoded offline and stored. This reduces the bit rate because the offline encoder is more efficient in comparison to a realtime encoder. The known content can be stored as multiple video sequences that correspond to the background video sequences of different situations. An idle background video sequence, an anticipatory background video sequence, etc., can be encoded offline and stored by the server. This can be done because much of the content, including movement, is known and controlled by the server.

When the face animation video is streamed to a client, the server does not have to encode the entire video sequence online because it has already been partially encoded offline. The server only has to encode the content that was not known offline and insert the online encoded portion into the offline encoded portion. In one embodiment, this is done at a macroblock level. In other words, macroblocks of the offline encoded video are replaced with new macroblocks from the online encoded video. One of skill in the art can appreciate that the present invention can be applied, for example, to blocks as well as to macroblocks. Replacing a macroblock includes, but is not limited to, replacing a block or a portion of a block or a macroblock.

For example, FIG. 3 illustrates an exemplary method for encoding a video stream or a portion of a video stream offline. For a face animation video, each macroblock that corresponds to a mouth or eye image is labeled (302). More generally, each macroblock that corresponds to content that is not known offline is labeled. After the macroblocks that correspond to the mouth or eye images are labeled, the background sequence video(s) are encoded (304) offline. Typically, information of unlabeled macroblocks cannot refer to labeled macroblocks. In one embodiment, for example, motion vectors of an unlabeled macroblock cannot refer to labeled macroblocks (306). Also, a macroblock list may be created that identifies the labeled macroblocks (308) in the offline encoded video sequences.

FIG. 4 illustrates an exemplary method for encoding a video stream using the previously encoded background video sequences that include labeled macroblocks. During animation or while streaming the video to the client, the encoder prepares the video of the animated face video using the offline bit stream for the background video sequence(s), the labeled background sequence, the bit stream of the encoded background sequence, and the macroblock list.

As the encoder encodes (402) the previously unknown portion of the video stream, the encoder identifies the next labeled macroblock (404) in a particular offline encoded video sequence. The labeled macroblock corresponds to data or content that is not available to the offline encoder, such as content of an eye or mouth in face animation. At this point, however, the content of the macroblock is known and is being encoded into the video. Thus, the motion for the labeled macroblock is estimated (406). Usually, a fast motion estimation is performed and the motion vector of the corresponding block in the background sequence can be used as a candidate while estimating the motion of the labeled macroblock. The online encoder also computes a mode decision (410) for the labeled macroblock.

Using the macroblock list in one embodiment, the newly encoded macroblock is inserted in the video bitstream using the macroblock list (412) to replace the corresponding labeled macroblock of the offline encoded video. In other words, the encoder replaces bits in the bit stream of the background video sequence using the macroblock list for identification purposes. The macroblock list is updated (414) to account for the different number of bits used for the macroblock of the offline background video sequence compared with the bits used in the online encoded macroblock in the video sequence. As soon as the macroblocks of the current frame are coded, the frame is sent to the channel (416). In this example, a single bitstream is served to the client. The bitstream includes the online encoded video that was inserted into the offline encoded video.

The bit rate of face animation video can also be reduced by storing more than one reference frame or video sequence at the client. One of the properties of sample-based face animation, as previously stated, is that the location of moving parts such as the head and the upper body are known at all times. This permits more than one background video sequence to be created and each background video sequence includes certain known motions. Thus, the background sequence needed to animate a particular utterance can be selected from one of several background sequences. In addition, background sequences can be concatenated in an arbitrary order.

To reduce the bit rate of a video stream, one or more background video sequences are downloaded by a client and stored in a frame store. The bit rate is reduced because the server no longer needs to stream the background video sequences that are stored in the frame store of the client. The server can simply instruct the client to play a particular background sequence. In this scenario, the client or decoder typically has the responsibility of replacing macroblocks of the previously downloaded background video sequences with the online encoded video received from the server. In addition, the online encoded content served to the client is oriented for the background video sequences that the server instructs the client to render. This is possible because, as previously stated, the position of the head in the background video sequences is already known to the server. Thus, the server is able to position the eyes in the eye portion of the video to match the position of the head in the background video sequence. The client simply replaces the macroblocks (or other unit) of the background video sequence with the online encoded video received from the server.

Figure 5:
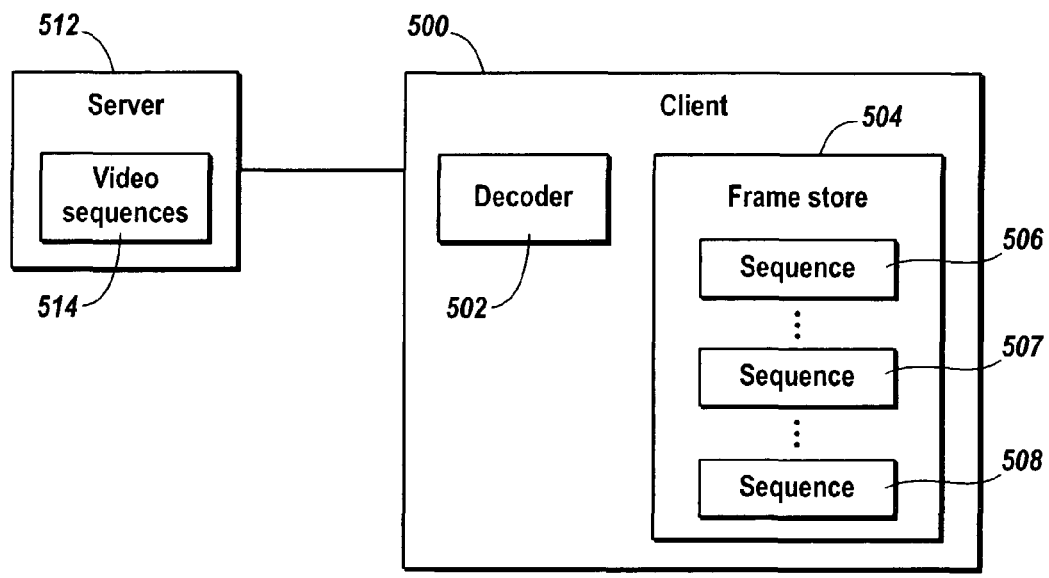
FIG. 5 illustrates a frame store of a client that stores multiple video sequences.

For example, FIG. 5 illustrates a client that has a frame store 504 that can be used by a decoder 502. In one embodiment, the client 500 can store several video sequences in the frame store 504. The frame store 504 of the client 500 stores video sequences 506, 507, and 508, which are examples of the video sequences 514 that the server 512 may generate offline, for example. The video sequences 514, however, may also be encoded online and stored by the client 500 in the frame store 504. In one example, the sequence 506 may be an idle sequence that can be displayed to the user while waiting. The sequence 507 may be an anticipatory sequence that can be used to indicate that the face is waiting for input from the user. The sequence 508 may be a transition sequence that includes frames for transitions between other video sequences. For example, the sequence 508 may be a transition between the sequence 506 and the sequence 507.

When the server 512 decides to show one of the sequences in the frame store, it can simply identify the sequence to be displayed and instruct the client to display that video sequence. The bit rate of the video delivered from a server to a client can be significantly reduced as soon as a particular video sequence is played more than once. The server serves the sequence the first time and the sequence is then stored in the frame store 504. The second time that sequence is played, the server simply identifies the video sequence, which is stored in the frame store of the client, and instructs the client to play the identified video sequence. The video sequence can be played forwards, backwards, or partially played according to the instructions sent by the server.

The client can also be used to store entire background sequences. The encoder sends the offline encoded video sequence into the frame store. When the actual video sequence is transmitted to the client, the encoder signals or identifies the frames that should be used for unlabeled macroblocks. The labeled macroblocks are encoded and sent as described above. In addition to reducing the bit rate during a dialog, the buffer sizes of the encoder and the decoder can be reduced, thereby reducing the latency of the system.

In another embodiment of the present invention, the server can encode potential content for the unknown portion of the video sequences. For example, the server may encode the eye content that is expected to be used repeatedly. An eye blink, for instance, may be used more than once. The eye blink can also be encoded offline and stored in the frame store of the client. In other words, different eye video sequences or mouth video sequences can be encoded offline and then combined with the background video sequences as needed or stored in the frame store of the client.

When the client 500 plays, for example, a face animation video, the client 500 typically has the responsibility to replace the labeled macroblocks of the video sequences stored in the frame store 504 with the macroblocks sent by the server 512. For example, if the server 512 instructs the client to play the video sequence 506, then the server 512 encodes and sends the eye and mouth videos for the video sequence 506. The client 500 replaces the labeled macroblocks of the video sequence 506 with the macroblocks of the eye and mouth videos sent by the server 512.

In this situation, the server 512 typically warps the eye and mouth video to fit the orientation of the head that is included in the video sequence 506. The server 512 is able to warp the eye and mouth videos because, as previously stated, the position of the head is known and controlled by the server 512. Warping the eye and mouth video includes matching the orientation of the eyes and/or mouth with a position of the head.

One advantage of the present invention is that the server 512 and the client 500 do not have to process as much data as is otherwise required for a full video bit stream. Thus, the buffers required at the server 512 and the client 500 can be reduced, which reduces latency.

Figure 6:
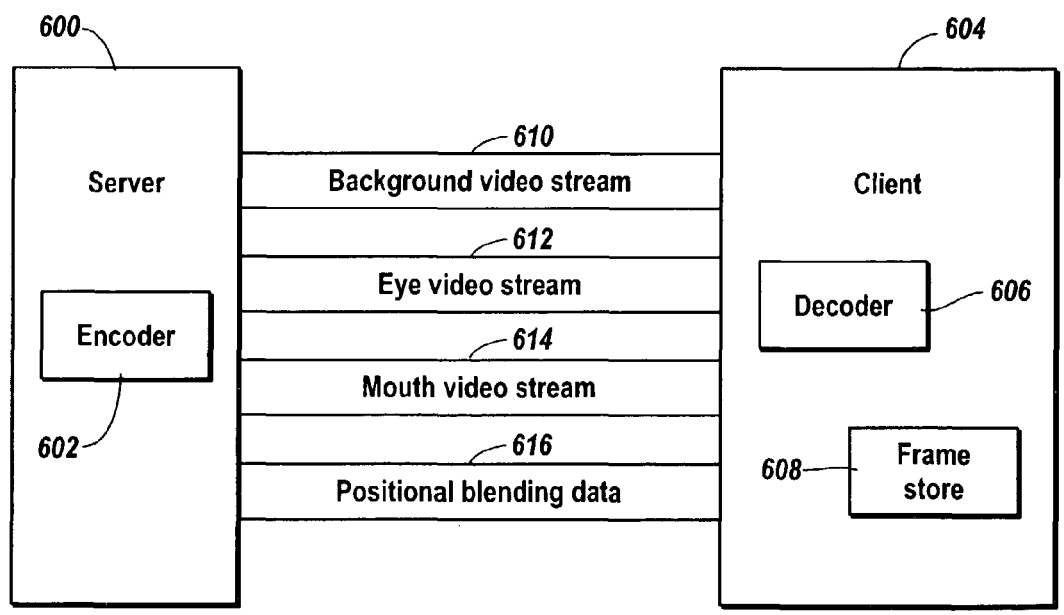
FIG. 6 illustrates one embodiment delivering a face animation video using multiple video streams.

FIG. 6 is a block diagram illustrating a method for delivering face animated video using multiple video streams. In FIG. 6, the server 600 delivers a background video stream 610, an eye video stream 612, a mouth video stream 614, and a positional blending data 616. Alternatively, the eye video stream 612 may include a left eye video stream and a right eye video stream.

In this example, the background video stream 610 is encoded offline as previously described using the encoder 602. The encoder 602 may also be used to encode a video stream online, for example. The background video stream 610 typically includes the eye and mouth areas. The eye video stream 612 and the mouth video stream 614 are encoded in realtime and are transmitted to the decoder 606 of the client 604. The eye video stream 612 and the mouth video stream 614 are overlaid on the background video stream 610. In one embodiment, the background video stream 610 can be transmitted simultaneously with the eye video stream 612 and the mouth video stream 614.

To insure that the eye video stream 612 and the mouth video stream 614 follow movement of the head, the proper position of the eye video stream 612 and the mouth video stream 614 are described in a scene graph that is included in the positional blending data 616 and that describes the relative positions of the eye video stream, the mouth video stream, and the background video stream.

For example, each frame or set of frames can be associated with a scene graph that describes the position of the eyes, mouth, head, etc., for that frame or set of frames. The scene graph can be updated as needed. The motion or movement of the head is determined by the server and thus the proper position of the eyes and mouth are also known to the server 600. The positioning information is included in the scene graph, which enables the animated face to be properly displayed. The positional blending data 616 may be transmitted as side information to the background video and stored as part of the background video sequence(s) in the frame store 608.

In one embodiment, the motion of the head is often deterministic. In other words, the motion of the head may have an impact on the content of the eye and mouth video streams. Thus, frequently used eye and mouth video sequences can be pre-computed and encoded offline. Some of the eye and mouth video sequences can be stored in the frame store 608 and played when directed by the server 600.

The positional blending data 616 also includes an alpha map that provides blending information to the decoder. The alpha map is typically associated with both the eye video stream 612 and the mouth video stream 614 and the alpha map defines the blending function(s) with which the eye video stream 612 and the mouth video stream 614 are blended into the background video stream 610. The blending function(s) included in the alpha map help mask any transitions that may be present between the background video stream and the eye and mouth video streams.

Because the alpha map is associated with the mouth and/or eye video stream, the client needs to map this video stream using a mapping function like warping into the right position appropriate for the background sequence. This mapping information typically depends only on the background video and may be transmitted as side information to the background video. Applying this mapping function at the client reduces the load at the server as the server can encode the mouth and eye video streams independent of the background sequences. The servers typically is able to either map the eye and mouth videos at the server or simply provide the alpha map that enables the client to map the eye and mouth videos onto the background video.

The blending information can also be determined at the server 600. The background video sequence 610 is blended into the mouth and eye video streams. In this case, the encoding of the eye and mouth video streams should be performed at a quality level that is similar or better than the background video stream. There are at least two ways or arranging the blending of the background sequence with the eye and mouth videos.

First, the encoder(s) code the labeled macroblocks that contain information from the eye or mouth videos as well as from the background video sequence. The decoder replaces the macroblocks (blocks or other unit) of the background video sequence that is already available to the decoder with the macroblocks of the eye and mouth videos prior to displaying the complete face animation video. Second, the server transmits alpha maps for each frame when downloading background sequences to the client. When the eye and mouth videos are encoded, the encoder takes just the eye and mouth videos from the server's database, and then sends the eye and mouth videos. The decoder maps or warps the eye and mouth videos into an orientation and positions appropriate for the current background frame and blends the background sequence and the eye/mouth videos using the alpha map of the background sequence and the positioning information of the scene graph.

The present invention extends to both methods and systems for video coding of animated talking heads and more particularly to video coding of animated talking heads using partial offline encoding, multiple video streams, and multiple reference streams. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion provides a brief, general description of a suitable computing environment in which the invention may be implemented. Although not required, the invention is described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for encoding a face animation video stream, the method comprising:
   identifying a first portion of the video stream, wherein the face animation video stream comprises a face animation which includes a head, an eye and a mouth, where the first portion corresponds to a plurality of offline encoded portions, where the plurality of offline encoded portions were previously stored, wherein the first portion has content that is known offline;
   labeling each macroblock of the video stream that corresponds to a second portion of the video stream, wherein macroblocks of the video stream that correspond to the first portion of the video stream are unlabeled;
   encoding the second portion of the video stream online, wherein the second portion has content that is unknown offline, wherein the encoding the second portion of the video stream online comprises:
      identifying a particular labeled macroblock in the video stream; and
      replacing the particular labeled macroblock corresponding to a previously offline encoded and stored macroblock with an online encoded macroblock, wherein each macroblock that is labeled is encoded online, whereas each macroblock that is unlabeled is encoded offline;
   performing a motion estimation for all macroblocks that are labeled;
   warping all macroblocks that are labeled in accordance with the motion estimation associated with the respective macroblock that is labeled to fit an orientation of the face animation, wherein all macroblocks that are labeled include the eye and the mouth and the warping all macroblocks that are labeled includes matching the orientation of the eye and the mouth with a position of the head;
   generating a macroblock list that identifies each macroblock that is labeled;
   updating the macroblock list to account for a difference in a number of bits used for the particular labeled macroblock and the online encoded macroblock; and
   sending the video stream to a client, wherein macroblocks that are labeled in the video stream that has been encoded are replaced with online encoded macroblocks, wherein the video stream that is sent to the client is sent as a single bitstream.

2. The method as defined in claim 1, wherein information in unlabeled macroblocks does not refer to information that is coded in labeled macroblocks.

3. The method as defined in claim 2, wherein motion vectors of the unlabeled macroblocks do not refer to labeled macroblocks.

4. A non-transitory computer readable storage medium having computer-executable instructions for performing the method of claim 1.

\* \* \* \* \*